United States Patent [19]
Cozzini et al.

[11] Patent Number: 5,830,525
[45] Date of Patent: Nov. 3, 1998

[54] BACON PRODUCT AND PROCESSING METHOD

[75] Inventors: Ivo Cozzini, Lincolnwood, Ill.; Matthew Walker, Marietta, Ga.

[73] Assignee: Cozzini, Inc., Chicago, Ill.

[21] Appl. No.: 827,970

[22] Filed: Apr. 14, 1997

Related U.S. Application Data

[60] Provisional application No. 60/016,777 May 7, 1996.

[51] Int. Cl.⁶ .............. A23B 4/00; A23C 1/10; A01J 1/10
[52] U.S. Cl. ............ 426/641; 426/218; 426/442; 426/513; 426/519; 426/520
[58] Field of Search ................... 426/641, 513, 426/519, 520, 442, 218

[56] References Cited

U.S. PATENT DOCUMENTS

| | | | |
|---|---|---|---|
| 3,769,037 | 10/1973 | Sholl | 426/281 |
| 4,343,821 | 8/1982 | Rose | 426/247 |
| 4,409,704 | 10/1983 | Seiffhart | 99/535 |
| 4,463,027 | 7/1984 | Chandler et al. | 426/652 |
| 4,543,260 | 9/1985 | Brotsky | 426/266 |
| 4,576,825 | 3/1986 | Tracy et al. | 426/266 |
| 4,903,590 | 2/1990 | Muller et al. | 99/487 |
| 4,960,599 | 10/1990 | Cozzini et al. | 426/281 |
| 5,638,744 | 6/1997 | Smith | 99/487 |

*Primary Examiner*—Nina Bhat
*Attorney, Agent, or Firm*—Lee, Mann, Smith, McWilliams, Sweeney & Ohlson

[57] ABSTRACT

A processed meat product such as bacon and a process for treating meat cuts for use in the production of a processed meat product. Particulate meat material is mixed with a pickle solution to form a mixture. The pickle solution and meat material mixture is fed through a reduction mill to form a suspension. The temperature of the suspension is raised during milling to approximately 45° F. or higher. Subsequent to milling the temperature of the suspension is decreased to approximately 32° F. or lower. The cooled suspension is then injected into a meat cut. The injected meat cut is then thermally treated to form a bacon or bacon-like product having an increase in weight of 0% to 49% above the weight of the meat cut prior to injection.

19 Claims, No Drawings

BACON PRODUCT AND PROCESSING METHOD

RELATED APPLICATIONS

This application claims the benefit of U.S. Provisional Application No. 60/016,777, filed May 7, 1996.

BACKGROUND OF THE INVENTION

The present invention is directed to a processed meat product, such as bacon or a bacon-like product, and a method for producing the processed meat product, wherein the unprocessed raw meat, from which the processed meat product is produced, is injected with a homogenous solution containing ingredients such as water, salts, meats, meat extracts and other seasonings and proteins to increase the product weight above its unprocessed weight. The resultant processed meat product yields up to sixty-seven percent of the weight of the original raw and unprocessed form of the meat as a cooked ready to eat processed meat product or a partially cooked processed meat product, such as bacon.

Traditionally, bacon has been made in one of two ways. In the first way, pork bellies are cured with a dry mixture of salt, salts of nitrate and nitrite, cure accelerators such as ascorbic acid, and seasonings and spices. This mixture is allowed to penetrate the pork belly for a time sufficient to develop a desired texture and flavor. The cure mixture is removed from the pork belly which is then heat processed until a desired internal temperature of approximately 130° F. (54° C.) is reached to produce a traditional bacon product. The traditional bacon product may be subjected to natural smoke or smoke flavoring during the heat processing cycle. The weight of the traditional bacon product after heat treatment does not exceed the weight of the raw pork belly from which the bacon was made and is usually in the range of 70% to 100% of the raw green weight.

The other traditional way of making bacon is to inject the pork belly with a curing solution of water, salt, salts of nitrate and nitrite, cure accelerators, spices and seasonings. The pork belly is subsequently heat processed to the desired internal temperature to produce the traditional bacon product. The traditional bacon product may be subjected to natural smoke or smoke flavoring. The weight of the traditional bacon product processed by this method, after heat treatment, normally equals its raw green weight.

Cooked, ready to eat traditional bacon prepared by either of these processes yields approximately forty percent (40%) of the weight of the unprocessed raw pork belly from which it was made. Thus one pound of raw pork bellies with added trim or additives could yield 0.4 pounds (6.4 ounces) of cooked ready to eat traditional bacon.

SUMMARY OF THE INVENTION

The present invention relates to a processed meat product such as bacon or a bacon-like product and a process for producing it. The processed meat product of the invention is produced by mixing particulate meat material with a pickle solution or additives such as binders or extenders to form a mixture. The particulate meat material may include any species of meat, including poultry or seafood, meat extracts and poultry extracts. The pickle solution may include protein and non-protein binders and extenders, water, salt, salts of nitrate or nitrite, spices and seasonings. The pickle solution and particulate meat mixture is fed through a reduction mill to form a homogenous suspension. During milling of the mixture, the temperature of the resulting suspension is increased to approximately 45° F. or higher. After milling, the temperature of the suspension is decreased to approximately 32° F. or lower while preventing the separation of the fat from the protein in the suspension. A quantity of the cooled suspension is then injected into a meat product, such as for example a pork belly or a selected beef cut, poultry cut, or seafood cut. The injected meat product is then thermal processed to a desired internal temperature to form the processed meat product, such as bacon or a bacon-like product, of the present invention. The injected meat product may be subjected to natural smoke or smoke flavoring. The weight of the meat product after injection ranges from about 1.00 to about 1.49 times the weight of the raw pork belly or other meat cut prior to thermal processing. The processed meat product when cooked yields up to sixty-seven percent of the weight of the unprocessed raw meat product from which it was made.

DETAILED DESCRIPTION OF THE PREFERRED EMBODIMENT

The process of the present invention may be used on or in connection with various types of meat. The term "meat" as used in this application includes various types of pork, beef, poultry, fish and other types of seafood, and other types of meat. This process is preferably used in connection with pork bellies to produce bacon or with other types of meat to produce bacon-like products such as beef bacon, turkey bacon and other bacon substitute products. The process includes the preparation of a solution having a homogenous suspension of ingredients. A sufficient quantity of the suspension is injected into a raw meat product to provide a desired increase in the weight of the raw meat product above its original or green weight. As used in this application the phase "raw meat product" includes any type of meat product to be treated with the process of this invention, regardless of whether the raw meat product may have undergone some type of pre-process treatment.

The injectable suspension preferably includes a pickle solution. The pickle solution is prepared such that it will provide about 120 parts per million (ppm) of nitrite and 550 ppm of ascorbate by weight after injection into the raw meat product, based upon the weight of the injected meat product after a specified drain time, which can be any period of time up to thirty minutes after injection. The percentage of weight gain of the injected meat product above its original green weight due to the injection of the suspension is referred to as the "percent pump". The 120 ppm of nitrite and 550 ppm of ascorbate is obtained in the injected meat product by combining the proper amounts of nitrite and ascorbate in the pickle solution based upon the desired "percent pump" after the specified drain time.

The required amounts of nitrite, ascorbate and other ingredients to be added to the pickle solution are calculated by a pickle formula. To calculate the quantity of each ingredient for the pickle solution, the following information is required:

1. The percent, by weight, of nitrite desired in the meat product, which is preferably approximately 0.012% (120 ppm).
2. The percent, by weight, of ascorbate or other cure accelerants as desired in the meat product, which is preferably approximately 0.055% (550 ppm).
3. The percent, by weight, of salt desired in the meat product, which can be varied as desired, but which is usually between 2%–3%.
4. The percent, by weight, of sugar desired in the meat product, which can be varied or eliminated as desired.

5. The percent, by weight, of phosphate desired in the meat product, which can be varied as desired, up to 0.5%.
6. The percent, by weight, of other flavorings or seasonings desired in the meat product, if any.

Once all of the amounts of the above ingredients have been calculated, they are added together and subtracted from the total number of pounds of pickle solution to be made, which provides the amount of water to be used in the pickle solution. Optional ingredients such as maple flavoring, ascorbic acid, binders and extenders, carrageenan or non-protein binders may be added to the pickle solution and mixed therein.

As an example, to prepare 500 pounds of pickle solution, that at a twelve percent (0.12) pump (a twelve percent weight increase of the meat product provided by the injected suspension) will introduce 0.012% (0.00012) of nitrite, 0.055% (0.00055) of ascorbate, 2% (0.02) salt, 0.75% (0.0075) sugar and 0.5% (0.005) phosphate into a pork belly to produce bacon, the following quantities of each ingredient will be required.

1. Nitrite required=[0.00012 (nitrate)/0.12 (pump)]×500 pounds of pickle=0.5 pounds of nitrite.
2. Ascorbate required=[0.00055 (ascorbate)/0.12 (pump)]×500 pounds of pickle=2.29 pounds of ascorbate
3. Salt required=[0.02 (salt)/0.12 (pump)]×500 pounds of pickle=83.0 pounds of salt
4. Sugar required=[0.0075(sugar)/0.12 (pump)]×500 pounds of pickle=31.25 pounds of sugar.
5. Phosphate required=[0.005(phosphate)/0.12 (pump)]×500 pounds of pickle=20.83 pounds of phosphate.

The combined weights of the above nitrite, ascorbate, salt, sugar and phosphate ingredients total 137.87 pounds. The 500 pounds of pickle solution less the 137.87 pounds of ingredients equals 362.13 pounds of water that is required to provide 500 pounds of the pickle solution. The 362.13 pounds of water converts to 43.47 gallons of water at 8.33 pounds per gallon of water at 68° F. (20° C.). The density of water changes as a function of temperature and should be taken into account in preparing the pickle solution.

The proper amount of each pickle solution ingredient should be completely mixed and dissolved in the water or other liquid medium. The water of the pickle solution should preferably be as cold as possible and within a 10° F. (−12° C.) to 40° F. (4° C.) temperature range. The pickle solution should not be over agitated and air agitation should be avoided as excess agitation dissipates ascorbate and nitrate. A hydrometer, such as a salometer, is preferably used to check the specific gravity of the finished batch of pickle solution. The specific gravity of each batch of pickle solution made according to the same recipe should remain constant.

Fresh and/or frozen meat from any one or more species of meat such as pork, beef, poultry or fish is ground or flaked to a one-quarter inch size or smaller to produce particulate meat material or trim. From approximately 25% to 100% of the trim may include ends and pieces that have already been cooked and that were recovered from a previously prepared bacon or bacon-like product, depending on the end users acceptance of the finalized texture. Meat for the purposes of the present invention includes fat and lean tissue. The meat may preferably range from approximately 40% lean and 60% fat to approximately 90% lean and 10% fat. The meat material can be fresh or frozen.

The pickle solution and the meat material are combined and mixed in an open hopper. The particulate meat material which is mixed with the pickle solution may include one or more species of meat. The proportions by weight of pickle solution to particulate meat material can range from 50% pickle solution and 50% particulate meat material to 98% pickle solution and 2% particulate meat material, with the preferred ratio being approximately 80% pickle solution and 20% particulate meat material. The mixing of the pickle solution and particulate meat material can be performed automatically by metering quantities of the pickle solution with a consistent feed of a predetermined amount of the particulate meat material.

A pump is connected to a hopper and feeds the pickle and particulate meat mixture to a reduction mill such as the model AR-901® mill which is commercially available from Cozzini, Inc. of Chicago, Ill. The reduction mill reduces the pickle and meat mixture into a suspension as the mixture passes through the reduction mill. The discharge pipe of the reduction mill is restricted in size to increase the back pressure within the reduction mill thereby causing the suspension to remain within the cutting chamber of the reduction mill for an increased period of time to thereby increase the temperature of the suspension. Other methods for increasing the suspension temperature include the use of multiple plates and knives in the reduction mill, and also remilling. The temperature of the pickle and meat mixture is preferably in the range of 20° F. (−7° C.) to 30° F. (−1° C.) as it is pumped into the reduction mill. Methods for controlling the temperature of the pickle and particulate meat mixture prior to milling include the use of a higher or lower temperature pickle solution, the use of higher or lower temperature trim, and other methods that are known to a person of skill in the art. The reduction mill preferably increases the temperature of the resulting suspension to a temperature of between approximately 45° F. (7° C.) and approximately 60° F. (16° C.). The suspension is preferably subjected to a vacuum of 16 to 29.9 inches of mercury after milling in order to increase the density of the suspension and to reduce foaming or defoam the suspension. Alternatively, if desired, the pickle and meat mixture may be subjected to a vacuum of 16 to 29.9 inches of mercury prior to milling.

The desired temperature of the suspension after milling will vary depending on the specific characteristic of the fat within the suspension. To achieve a superior suspension, it is necessary to increase the temperature of the fat in the suspension until an aqueous phase of the fat is reached, which is approximately at the specific melting point temperature of the fat. For example, the melting point of fats range from approximately 45° F. (7° C.) to approximately 64° F. (18° C.). Raising the temperature of the suspension to 45° F. (7° C.) or above creates a higher viscosity, more homogenous suspension, in which particle size is greatly reduced from the size found in a normal suspension.

The warmed suspension is then pumped through a surface-swept heat exchanger or other similar heat transfer device and is cooled to approximately 32° F. (0° C.) while remaining in a liquid state. This reduction in temperature causes the fat particles in the suspension to coalesce and become homogeneous with the solution. Fat and protein normally separate at cold temperatures, however, the present method prevents the separation of the fat from the protein when the suspension is cooled. The reduction in temperature also inhibits the growth of bacteria and provides a control of the protein that is available during the injection process. The suspension is now ready for injection into the raw meat product such as a pork belly or selected beef cut.

The suspension is injected into the raw meat product with an injector device, such as used in the process of U.S. Pat.

No. 4,960,599, which is incorporated herein by reference. The injector may be a commonly available commercial meat injector, which is preferably equipped with a model EMP 327 feed pump and needles as sold by Cozzini, Inc. of Chicago, Ill. The suspension is preferably injected at a constant pressure ranging from zero pounds per square inch (psi) to seventy psi. The raw meat product, such as a pork belly or beef cut, to be injected is preferably at a temperature of from about 36° F. (2° C.) to about 44° F. (7° C.). Depending on the percentage of particulate meat material added to the pickle solution, the outside diameter of the injection needle can be as large as five millimeters. When injecting high levels of suspension into the raw meat product, it may be necessary to add surface pressure (14–60 psi) to the meat product to prevent seam disruption within the meat product. The surface pressure will also assist with the dispersion of the suspension within the meat product.

During the injection process, excess suspension that is not retained in the injected meat product is recovered and drained into a holding hopper. Once the suspension in the hopper reaches a high level sensor, the excess suspension is again pumped through the reduction mill after which a surface-swept heat exchanger or similar device is used to lower the temperature of the suspension to approximately 32° F. (0° C.) to prepare the suspension for further injection.

After the raw meat product is injected with the desired quantity of suspension to achieve the desired percent pump weight increase, the meat product is hung on racks for draining, then thermally processed for approximately four to twenty-four hours during which the injected meat product ray be subjected to either natural smoke or smoke flavoring for about two hours. During a thirty minute hang and drain time, the injected meat product experiences an average drip loss of about 1% of its weight, as opposed to an average drip loss of 3% by weight of traditional bacon product. Typically the core temperature of the thickest end of the injected meat product should reach an internal temperature of approximately 120° F. (49° C.) to 150° F. (66° C.). This temperature may be held for any desired amount of time. Once the injected meat product has been thermally processed to form the processed meat product, such as bacon or a bacon-like product, of the present invention, it is cooled and may then be pressed, sliced and packaged for distribution. The processed meat product of the present invention contains homogenized meat products, extracts of meat, binders and extenders.

The processed meat product of the present invention does not exhibit any textural or visual changes in appearance from traditional bacon characteristics and provides the same range of flavors as traditional bacon. The uncooked processed meat product of the present invention has a weight increase from 0% to 49% above the original green weight of the raw meat product. Thus the finished processed weight of the uncooked processed meat product can range from 100% to 149% of the initial green weight of the raw meat product depending on how large a quantity of the suspension is injected into the raw meat product. The added value may be calculated in various other manners.

The increase in finished product weight is attributed to increased meat weight from meat sources, increased weight from higher quantities of injected water (or other carrier medium), and increased cooking yields (water holding capacity of the bacon). These weight gains can be achieved in meat products which are used to produce processed meat products such as, but not limited to, traditional pork bacon and beef bacon.

The weight of test samples after injection ranged from 124% to 146% of green weight. Product weights of each sample were taken prior to injection, after injection, and after the thermal treatment process was completed. In one test a 24.61 percent increase in weight over the green weight of a pork belly was achieved by the injection of the suspension. Of the 24.61% weight increase, 19% of the weight increase was attributable to the pickle solution contained in the suspension and the remaining 5.61% of the weight increase was attributable to the meat contained in the suspension. After a thirty minute hang and drain time the injected meat product experienced a 0.85% weight loss. During thermal treatment and subsequent chilling a 7.24% weight loss occurred. No weight was lost during pressing. A 2.27% weight loss occurred during a four day cooler holding period. A 1% weight loss occurred during slicing. Thus the total weight loss after injection was 11.36%. The final yield equals the 24.6% initial weight gain less the 11.4% in weight losses, which equals a net 13.2% weight gain.

The fully cooked ready to eat or partially cooked bacon or bacon-like product of the present invention yields up to 67% of the weight of the raw meat product from which the bacon or bacon-like product was prepared. Thus one pound of raw meat product, such as a pork belly, can yield up to 0.67 pounds (10.7 ounces) of cooked bacon. As compared to typical bacon, which yields 0.40 pounds (6.4 ounces) of cooked bacon from one pound of raw pork belly, the bacon product and processing method of the present invention provides a significant increase in the yield of cooked bacon which can be obtained from a given quantity of raw meat product.

Various features of the invention have been particularly described in the specification herein, however, it must be understood that these particular features merely illustrate, and that the invention is to be given its fullest interpretation within the terms of the appended claims.

What is claimed is:

1. A method for producing a processed meat product comprising:
   mixing particulate meat material with a pickle solution to form a mixture;
   milling the pickle solution and meat material mixture to form a suspension;
   controlling the temperature of the suspension at the conclusion of the milling step to approximately 45° F. or higher;
   decreasing the temperature of the suspension to approximately 32° F. or lower; and
   injecting a quantity of the cooled suspension into a meat product.

2. The method of claim 1 including the step of controlling the temperature of the pickle solution and meat material mixture during the mixing step prior to milling to between approximately 20° F. and approximately 30° F.

3. The method of claim 1 wherein the suspension includes protein and fat and including the step of controlling the temperature of the suspension at the conclusion of the milling step to approximately 45° F. or higher and to a temperature equal to or greater than the specific melting point of the fat in the suspension.

4. The method of claim 1 including the step of controlling the temperature of the meat product to between approximately 36° F. and approximately 44° F. during the time when the suspension is injected into the meat product.

5. The method of claim 1 including the step of controlling the composition of the pickle solution and meat material mixture to include approximately 50% to 98% pickle solution and approximately 2% to 50% particulate meat material by weight.

6. The method of claim 5 including the step of controlling the composition of the pickle solution and particulate meat mixture to approximately 80% pickle solution and 20% particulate meat material by weight.

7. The method of claim 1 including the step of subjecting the suspension to a vacuum after the milling step.

8. The method of claim 7 wherein the vacuum is between approximately 16 inches of mercury and approximately 29.9 inches of mercury.

9. The method of claim 1 including the step of preparing a pickle solution comprising a mixture of water and salt.

10. The method of claim 9 including the step of adding a mixture of cure accelerants to the pickle solution.

11. The method of claim 1 including the step of cooling the suspension by passing the suspension through a heat exchanger.

12. The method of claim 1 including the step of thermal treating the injected meat product to an internal temperature of approximately 120° F. or higher.

13. The method of claim 1 including the step of adding surface pressure of between approximately fourteen pounds per square inch to approximately sixty pounds per square inch on the meat product during the step of injecting the suspension into the meat product.

14. The method of claim 1 including the step of reducing the particle size of the particulate meat material to approximately one quarter inch or smaller prior to the step of mixing the particulate meat material with the pickle solution.

15. The method of claim 1 wherein said meat product comprises a pork belly.

16. The method of claim 1 wherein said meat product comprises beef.

17. The method of claim 1 wherein said meat product comprises poultry.

18. The method of claim 1 wherein said meat product comprises seafood.

19. A processed meat product produced in accordance with the method of claim 1.

* * * * *